United States Patent Office 3,639,393
Patented Feb. 1, 1972

3,639,393
3β,14β-DIHYDROXY-CARDA-4,20(22)-DIENOLIDES
AND PROCESS FOR PREPARING THEM
Werner Fritsch, Neuenhain, Taunus, and Ulrich Stache
and Werner Haede, Hofheim, Taunus, and Kurt
Radscheit, Kelkheim, Taunus, Germany, assignors to
Farbwerke Hoechst Aktiengesellschaft vormals Meister
Lucius & Bruning, Frankfurt am Main, Germany
No Drawing. Filed Apr. 15, 1969, Ser. No. 816,389
Claims priority, application Germany, Apr. 24, 1968,
P 17 68 275.6
Int. Cl. C07c 173/02
U.S. Cl. 260—239.57         2 Claims

ABSTRACT OF THE DISCLOSURE

A process for preparing 3β,14β-dihydroxy-carda-4,20-(22)-dienolides which comprises reducing 3-oxo-carda-4,14,20(22)-trienolides by means of complex metal hydrides to the corresponding 3β-hydroxy-carda-4,14,20-(22)-trienolides; treating these compounds with acylating agents; reacting the resulting 3β-acyloxy-carda-4,14,20(22)-trienolides with N-bromo-acyl amides; and catalytically hydrogenating the 4β-acyloxy-3β,14β-dihydroxy-5α,15α-dibromo-card-20(22)-enolides so obtained in the presence of a precious metal catalyst at a pH in the range from 4.5 to 7.5. The products of the invention are valuable therapeutics for oral administration in diseases of the heart and circulation.

---

The present invention relates to a process for preparing 3β,14β-dihydroxy-carda-4,20(22)-dienolides.

It is known that 3α,14β-dihydroxy-card-20(22)-enolides are obtained by reducing 3-oxo-14β-hydroxy-card-20(22)-enolides with complex metal hydrides such as sodium borohydride or lithium aluminum tri (tert.butoxy) hydride [Helv. chim. Acta, vol. 36, p. 985 (1953); vol. 43, p. 338 (1960)].

Furthermore it is known that 3β,14β-dihydroxy-carda-4,20(22)-dienolide is obtained by reducing 3-oxo-14β-hydroxy-carda-4,20,(22)-dienolide by means of sodium borohydride [Helv. chim. Acta, vol. 46, p. 23 (1963)].

A process has now been found for preparing 3β,14β-dihydroxy-carda-4,20(22)-dienolides, which comprises reducing 3-oxo-carda-4,14,20(22)-trienolides by means of complex metal hydrides to the corresponding 3β-hydroxy-carda-4,14,20(22)-trienolides; treating these compounds with acylating agents; reacting the resulting 3β-acyloxy-carda-4,14,20(22)-trienolides with N-bromo-acyl amides; and catalytically hydrogenating the 4β-acyloxy-3β,14β-dihydroxy - 5α,15α - dibromo-card-20(22)-enolides so obtained in the presence of a precious metal catalyst at a pH from 4.5 to 7.5. The process of the invention proceeds, for example, according to the following scheme:

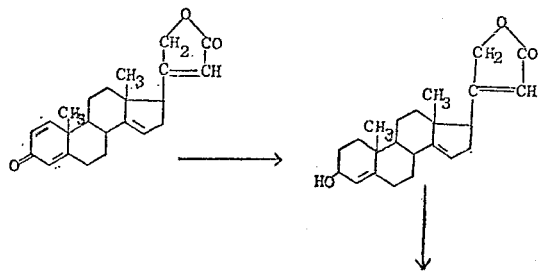

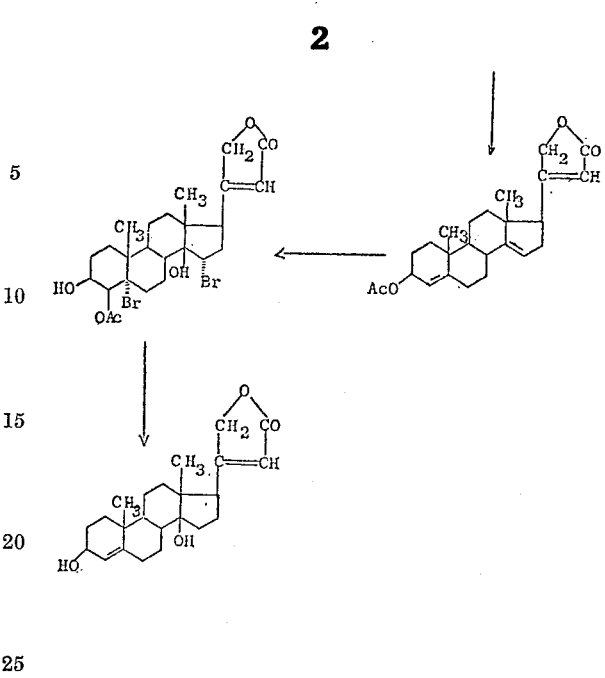

in which Ac represents a lower acyl radical, in the β-position, of a mono- or dicarboxylic acid containing at most 6 carbon atoms. As acyl radicals of a monocarboxylic acid, for example, formyl, acetyl, propionyl or butyryl radicals are used: as acyl radicals of a dicarboxylic acid, for example, the acyl radicals of malonic acid and, preferably, succinic acid may be mentioned.

The 3-oxo-carda-4,14,20(22)-trienolides used as starting materials may contain further substituents which are inert under the reaction conditions to the agents used, such as for example, acyloxy or alkyl groups in 1-, 2-, 6-, 7-, 11-, 12-, 16-, 17-, or 19-position. A method for preparing these compounds is disclosed in Belgian Pats. 686,295 and 695,311.

The 3-oxo-carda-4,14,20(22)-trienolides are reduced to the corresponding 3β-hydroxy-carda - 4,14,20(22) - trienolides with complex metal hydrides not affecting the cardenolide ring. For this purpose alkali borohydrides, preferably sodium borohydride and alkali aluminum trialkoxides, particularly lithium aluminum tri(tert.butoxy) hydride, are especially suited. As solvents, ethers are particularly convenient, for example, diethyl ether or, preferably, dioxane or tetrahydrofurane. The reaction requires one to several hours: the reaction temperatures range from approximately —20° to the boiling point of the ether used, for example 28–30° C.

The acylation which is necessary for the protection of the 3-hydroxy group can be performed in known manner by means of an acylating agent such as a carboxylic acid hydride or a carboxylic acid chloride in the presence of a tertiary base, preferably pyridine.

The further reaction to the 4β-acyloxy-3β,14β-dihydroxy-5,15-dibromo-card - 20(22) - enolides is conducted under analogous conditions as specified in Bull. Soc. chim. France (1966) No. 3, page 1114 for the preparation of 4β-acetoxy-3β-hydroxy-5-bromo-cholestanes or in Chr. Engel and G. Bach: "Steroids" vol. 3, page 593 (1964) for the manufacture of 3β-acetoxy-14β-hydroxy-15α-bromo-5β-card-20(22)-enolide. For this purpose N- halogenamides, preferably N-bromo-succinimide or bromoacetoamide, are reacted with 3β-acyloxy-card-4,14,20(22)-trienolides in dioxane in the presence of perchloric acid or N,N-dibromosulfamide and acetic acid at temperatures between 0° and 30°, preferably at room temperature, for about one or for several hours. The crude di-bromohydrines so obtained do not require further purification but are immediately subjected to hydrogenation whereby the 4,5-double bond is reintroduced with elimination of the 4-acyloxy group and hydrogenolytic cleavage of both the bromine atoms in 5- and 15-position.

In order to reduce undesirable side reactions, special conditions must be observed. In particular the pH of the reaction medium must be kept between 4.5 and 7.5.

The hydrogenation according to the present process is performed by means of catalytically activated hydrogen. As catalysts especially precious metals are used either in finely suspended form or precipitated on carriers. Especially advantageous has been the use of Raney-nickel activated by appropriate precious metals, for example, palladium. The Raney nickel used to this end is freed from excessive alkali by previous treatment with a dilute weak acid, for example, acetic acid. By continuous addition of an appropriate buffer solution neutralizing hydrobromic acid, for example, a mixture of sodium acetate and glacial acetic acid in methanol, the pH of the reaction mixture is maintained within the above indicated limits. As solvents there may be used those commonly applied for hydrogenation, for example, lower alcohols, tetrahydrofurane or dioxane and also mixtures thereof.

According to the process of the invention, for example the following compounds can be prepared: 12β-acetoxy-3β,14β-dihydroxy-carda - 4,20(22)-dienolide, 11α-acetoxy-3β,14β-dihydroxy-carda - 4,20(22) - dienolide, 11-oxo-3β,14β-dihydroxy-carda-4,20(22)-dienolide, 11-oxo-6α-methyl-3β,14β - dihydroxy-carda - 4,20(22) - dienolide, 19-acetoxy-3β,14β-dihydroxy-carda-4,20(22) - dienolide, 19-oxo-3β,14β-dihydroxy-carda-4,20(22)-dienolide.

The products of the invention display a strong positive inotropic action. Thus, the 3β,14β-dihydroxy-carda-4,20-(22)-dienolide exerts an effect on the heart which is comparable to that of digoxigenine. The products of the invention therefore constitute valuable therapeutics for oral application in diseases of the heart and the circulation.

The following examples are to illustrate the invention but they are not intended to limit it thereto, the parts and percentages being by weight unless otherwise stated.

EXAMPLE 1

3β-hydroxy-carda-4,14,20(22)-trienolide (a) 5.5 g. of 3-oxo-carda-4,14,20(22)-trienolide were added, while stirring and cooling with ice in an atmosphere of nitrogen, to 260 ml. of tetrahydrofurane containing 48.3 g. of lithium aluminum tri (tert.butoxy) hydride. After stirring for another 4½ hours at 0°, the reaction mixture was added dropwise with continuous stirring and cooling to 81.5 ml. of a mixture consisting of equal parts of glacial acetic acid and water, the internal temperature being kept below 20° C. The product was suction-filtered, the residue washed with a sufficient amount of methylene chloride (approximately 500 ml.), the filtrates were combined, washed to neutral with aqueous sodium bicarbonate solution and water, dried over sodium sulfate and evaporated to dryness in vacuo. After adding one drop of pyridine, the distillation residue was recrystallised from a mixture of methylene chloride and ether. 3.97 g. of 3β-hydroxy-carda-4,14,20(22)-trienolide were obtained; melting point 219–221° C.

(b) Into a well stirred suspension of 7.45 g. of 3-oxo-carda-4,14,20(22)-trienolide in 775 ml. of a mixture of dioxane/water (4:1), a solution of 3.13 g. of sodium borohydride in 440 ml. of a mixture of dioxane/water (4:1) was added within 45 minutes at 27–30° C. Stirring was continued for 5½ hours at 28–30° C., then the reaction mixture was concentrated in vacuo in a rotating evaporator. After cooling with ice the distillation residue was acidified with 2 N-sulfuric acid and the precipitating crystals were extracted with methylene chloride. The extracts were washed to neutral with sodium bicarbonate solution and water, dried over sodium sulfate and evaporated to dryness in vacuo. After recrystallisation from methylene chloride/ether, 5.31 g. of 3β-hydroxy-carda-4,14,20(22)-trienolide were obtained having a melting point of 215 to 218° C.

EXAMPLE 2

3β-acetoxy-carda-4,14,20(22)-trienolide 5.2 g. of 3β-hydroxy-carda-4,14,20(22)-trienolide were stirred for 16 hours in a mixture of 65 ml. of pyridine and 13 ml. of acetic anhydride at room temperature. The whole was subsequently introduced with stirring into 250 ml. of ice-cold water, the crystals which precipitated were suction-filtered after half an hour, the filter residue was washed with water and dried at 45° C. in vacuo. After recrystallisation from methylene chloride/methanol 5.07 g. of 3β-acetoxy-carda-4,14,20(22)-trienolide were obtained melting at 157–159° C.

EXAMPLE 3

4β-acetoxy-3β,14β-dihydroxy-5α,15α-dibromo-card-20(22)-enolide

To a solution of 1.143 g. of 3β-acetoxy-carda-4,14,20-(22)-trienolide in 43 ml. of dioxane were added 5.9 ml. of a mixture of 3.3 ml. of 68.8%-perchloric acid and 66 ml. of water and, immediately thereafter, under exclusion of light, 1.43 g. of freshly recrystallised N-bromoacetamide. After stirring for one hour at room temperature, the whole was poured into 300 ml. of water and extracted with a mixture of methylene chloride and ether. The extracts were washed neutral with water, dried over sodium sulfate and evaporated to dryness in vacuo. 1.87 g. of crude 4β-acetoxy-3β,14β-dihydroxy-5α,15α-dibromo-card-20(22)-enolide were obtained which were subjected to further reaction without further purification.

EXAMPLE 4

3β,14β-dihydroxy-carda 4,20(22)-dienolide (canarigenine)

A solution of 1.85 g. of crude 4β-acetoxy-3β,14β-dihydroxy-5α,15α-dibromo-card-20(22)-enolide in 20 ml. of methylene chloride was added to a previously hydrogenated suspension of 2.1 g. of Raney-nickel/palladium catalyst in 58 ml. of methanol containing 1 ml. of water. After adding the crude bromohydrine of Example 3, the mixture was catalytically hydrogenated as usual while maintaining the pH between 6.4 and 6.8 by adding dropwise a buffer solution prepared from 4.62 g. of sodium acetate containing water of crystallization, 4.00 ml. of glacial acetic acid and 23 ml. of methanol. After about 4 to 6 hours hydrogen absorption had practically ceased. Subsequently, the reaction product was suction-filtered, the filtrate evaporated in vacuo to about 15 ml. and mixed with water by stirring. The precipitate was taken up in methylene chloride. After washing with water and drying over sodium sulfate, the product was evaporated to dryness in vacuo and recrystallized from a small quantity of acetone/ether. 260 mg. of canarigenine were obtained melting between 245 and 257°.

We claim:

1. A process for preparing 3β,14β-dihydroxy-carda-4,20(22)-dienolides which comprises reducing 3-oxo-carda-4,14,20(22)-trienolides by means of complex metal hydrides to the corresponding 3β-hydroxy-carda-4,14,20

(22)-trienolides; treating these compounds with acylating agents; reacting the resulting 3β-acyloxy-carda-4,14,20(22)-trienolides with N-bromo-acyl amides; and catalytically hydrogenating the 4β-acyloxy-3β,14β-dihydroxy-5α,15α-dibromo-card-20(22)-enolides so obtained in the presence of a precious metal catalyst at a pH in the range from 4.5 to 7.5.

2. 4β-acetoxy-3β,14β-dihydroxy-5α,15α-dibromo-card-20(22)-enolide.

References Cited

UNITED STATES PATENTS

| 3,420,820 | 1/1969 | Stache et al. | 260—239.57 |
| 3,432,486 | 3/1969 | Minato | 260—210.5 |

HENRY A. FRENCH, Primary Examiner

U.S. Cl. X.R.

260—999